United States Patent Office 3,487,697
Patented Jan. 6, 1970

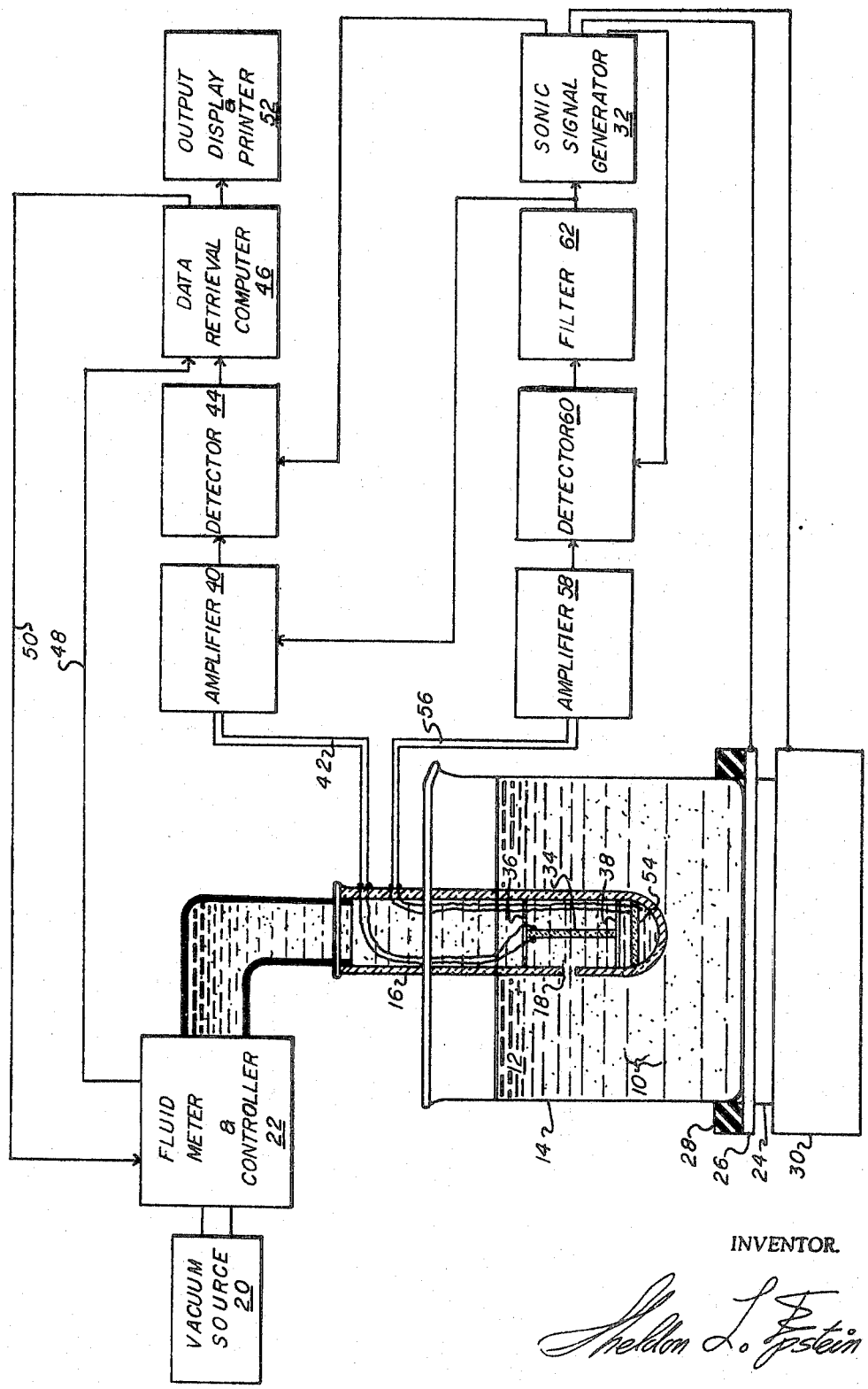

3,487,697
FLUID-SUSPENDED PARTICLE ANALYZER
Sheldon L. Epstein, P.O. Box 400,
Wilmette, Ill. 60091
Filed July 20, 1967, Ser. No. 654,881
Int. Cl. G01f 15/14
U.S. Cl. 73—432
10 Claims

ABSTRACT OF THE DISCLOSURE

An apparatus for counting the number and determining the size of particles suspended in a solution through the use of the change in sonic propagation characteristics. The fluid containing the suspended particles is drawn into a chamber having an aperture approximating the size of the particles. Electroacoustic transducers measures the changes in the sonic propagation of the aperture as the particles are drawn through it and an output display and printer record particle size and number.

BACKGROUND OF INVENTION

Field of invention

This invention is in the field of particle counting and sizing and, more particularly, is a new particle analyzer for measuring and counting particles such as blood cells in solution or contaminants suspended in air.

Description of the prior art

Although a number of methods are used to measure the gross properties of particles, such as their average color or their weight per unit volume, only two systems have been developed for counting or sizing particles on a high speed individual, rather than a gross, basis.

The first of these two systems to be developed was the optical scanning method in which particles, such as contaminants suspended in air, were swept through a narrow viewing zone to intercept a light beam which was aimed at a photosensitive device. The photosensitive device in turn generated electrical pulses which were a function of the particle surface area as viewed from a particular projection angle. An example of such a method is described in Patent No. 3,127,505 to Gustavson which issued on Mar. 31, 1964. Another similar instrument utilizing the scattering principle is discussed in Patent No. 2,997,597 which issued to Mumma on Aug. 22, 1961.

While the optical systems provide good results with spherical aerosol particles, they cannot be used for measuring particles suspended in optically dense media or for measuring particles, such as blood cells which have irregular geometries. Where either of these conditions exist, it is necessary to use a second system, sometimes known as the Coulter system, in which the particles are suspended in a conducting liquid and forced to flow through a narrow, electrically-charged orifice where the difference in electrical impedance between the particle and the supporting liquid is utilized to generated electrical pulses which are a function of the volumes (rather than areas for the optical systems) of the particles. The Coulter system is more fully described in Patent No. 2,656,508 of Oct. 23, 1953 to Coulter and later in Patent No. 3,259,842 of July 5, 1966 to Coulter et al.

The Coulter system, while providing the advantage of instrument simplicity, suffers from a number of limitations which makes it unusable for many important applications. The most serious of these is that it will not work when the particles to be analyzed are suspended in a nonconducting medium. Thus it cannot be readily used when air pollution or jet fuel contamination studies are being made.

As this limitation, as well as others, was found to place a severe constraint on the types of experiments and analyses which investigators were interested in performing, it was deemed necessary to develop a new system for counting and sizing fluid-suspended particles which would not require the use of conducting liquids nor place undue restrictions on scientific investigations.

The system of this invention, which is to be described, meets these criteria. In addition to being insensitive to the optical and electrical properties of the fluid media which may be used with it, the system of this invention presents no shock hazard and may be used with highly explosive or inflammable materials such as jet fuel or liquid oxygen. In place of high intensity lights and high voltages presently being used in particle scanning instruments, the system to be described uses dependable, easily packaged sonic transducers operated from low power, low voltage sources to transmit energy through the sample for measurement purposes.

DESCRIPTION OF A PREFERRED EMBODIMENT

A combination perspective and block diagram of a sonic energy, fluid-suspended particle analyzer of this invention is illustrated in the drawing.

Particles 10 to be counted and sized are suspended in a fluid, here shown to be a liquid 12 contained within a beaker 14, but which could also be a gas. Inserted within the beaker 14 and extending well into the liquid 12 is an aperture chamber, here a tube 16, containing an aperture 18 whose size approximates that of the particles to be studied. The upper end of the aperture tube 16 is connected to a vacuum source 20 through a fluid meter and controller 22 which meters and regulates the amount of particle-suspending fluid drawn through the aperture to the inside of the aperture tube 16 and then on to the vacuum source 20.

The particle analyzer of this invention operates on the principle that the sonic propagation characteristics of the aperture and its contents change when a significant percentage of the fluid in the aperture is displaced by a particle. Thus not only does the speed of propagation for the aperture change, but also its absorption coefficient. In order to measure either one of these changes, sonic energy is introduced into the particle suspending fluid on one side of the aperture and monitored on the other side of the aperture while particles are drawn through the aperture.

In the illustrated embodiment, the means for generating sonic energy in the fluid 12 suspending the particles 10 comprise an electroacoustic transducer 24, which may be a piezoelectric crystal or a magnetostrictive vibrator, to which the base of the beaker 14 is firmly attached by support plate 26 which incorporates grip ring 28. The transducer 24 is mounted on a heavy base 30 which along with the plate 26 may serve as an electrode for connecting sonic signal generator 32 to the transducer 24 for the purpose of energizing the transducer.

The transducer is excited in its longitudinal mode so that sonic energy is transmitted through the liquid 12 in the longitudinal or axial (with respect to the axis of the aperture tube 16) direction. Although it could be mounted within the beaker, the transducer 24 is mounted outside to reduce sample contamination problems.

Mounted within the aperture tube 16 is a second electroacoustic transducer 34 for transducing sonic energy transmitted through the aperture 12 into electrical signals.

The transducer 34 may comprise a thin piezoelectric wafer secured at its ends by spacers 36 and 38 which keep it suspended behind the aperture. By mounting the transducer 34 as shown with its axis of maximum transducing sensitivity parallel to the axis of the aperture and orthogonal to the direction of propagation of transducer 24, it remains insensitive to longitudinal or axial sonic signals transmitted through the walls of aperture tube 16 and detects only the shear or radial signals transmitted through the aperture 18. Because of the symmetrical construction of the aperture tube 16, the radial sonic signals will, for the most part, cancel except in the region of the aperture which will have a sonic impedance which is a function of the presence or absence and the size of a particle in it at any given time. As the sonic impedance changes as particles pass through the aperture, the amplitude and the phase of the sonic signals incident on the transducer 34, with respect to the transducer 24, will vary. These changes will, in turn, appear in the electrical signals generated by the transducer and transmitted to means for interpreting the electrical signals to determine the characteristics of the particles being drawn through the aperture.

In the illustrated embodiment, the interpreting means comprise an amplifier 40 whose input terminals are connected to the transducer 34 by wires 42, a signal detector 44, which may be an amplitude or phase sensitive detector, for demodulating the signal generated by the transducer 34, a data retrieved computer 46 for controlling the operation of the particle analyzer and for statistically evaluating the signal information transmitted to it from the detector 44. Information on fluid volume for the sample under examination is transmitted to the computer 46 from the fluid meter and controller 22 via data line 48 while operational commands to the fluid meter and controller 22 are transmitted from the computer to the controller on line 50.

The results of the analysis, including statistical evaluation and correlation where desired, are transmitted from the computer 46 to output display and printer 52 for viewing by the investigator and recording.

Because the sonic propagation characteristics of fluids change with changes in the ambient pressure and temperature, it is advisable to incorporate means for automatically regulating the response of the particle analyzer to compensate for changes in the sonic propagation characteristics of the fluids used to support the particles. In the illustrated embodiment, this feature is provided by incorporating a third electroacoustic transducer 54 within the aperture tube 16. The transducer 54 preferably is fixed to the bottom of the tube 16 with its axis of maximum transducer sensitivity oriented parallel to the direction of propagation of the first electroacoustic transducer 24. When positioned in this manner, the transducer 54 is most sensitive to axial signals and can be used to measure relative changes in the longitudinal absorption coefficient or the speed of propagation of the supporting fluid.

Signals from the transducer 54 are transmitted by wires 56 to amplifier 58. Detector 60, similar in structure and function to detector 44, is used to demodulate the electrical signals from the transducer 54. The demodulated signal is filtered by filter 62 before being transmitted as a feedback control signal to the sonic generator 32 and/or the amplifier 40 for the purpose of changing the performance of either element to compensate for the change in the sonic propagation characteristics of the fluid 12.

In addiiton to being adaptable to any fluid, liquid, or gas, conducting or non-conducting, the particle analyzer of this invention can be used with explosive or inflammable materials because neither high intensity radiation nor high voltages or currents are needed. Further this invention is extremely useful in situations where no sample contamination can be tolerated as the aperture tube can be sterilized and there is no need for external electrodes or transducer assemblies. The problem of debris clogging the aperture is minimized because there is no heating of the sample near the aperture and because the sonic energization of the sample tends to reduce particle concentrations near the aperture.

The illustrated embodiment comprises the most general form of particle analyzer of this invention. In general, optimum results can be obtained by operating the system in the ultrasonic range depending, of course, on the choice of fluid and the size of the aperture and the particles. In specific situations, changes can be made in its construction to optimize its performance without deviating from the scope of the invention.

I claim:
1. A fluid-suspended particle analyzer comprising:
    (a) an aperture chamber having in one of its walls an aperture whose size approximates that of the particles;
    (b) means for drawing fluid-suspended particles through the aperture;
    (c) means, located on one side of the aperture, for generating sonic energy in the fluid suspending the particles;
    (d) means, located on the other side of the aperture, for transducing sonic energy transmitted through the aperture into electrical signals; and
    (e) means for interpreting the electrical signals to determine the characteristics of the particles being drawn through the aperture.
2. The particle analyzer of claim 1 wherein the characteristic being determined is the size of the particle.
3. The particle analyzer of claim 1 wherein the means for generating sonic energy in the fluid suspending the particles comprise:
    an electroacoustic transducer which generates sonic waves having a direction of propagation orthogonal to the axis of the aperture.
4. The particle analyzer of claim 1 wherein the means for transducing the sonic energy transmitted through the aperture into electrical signals comprise:
    an electroacoustic transduced having its axis of maximum transducing sensitivity oriented parallel to the axis of the aperture.
5. The particle analyzer of claim 1 where in the means for interpreting the electrical signals to determine the characteristics of the particles being drawn through the aperture comprise:
    an amplitude sensitive detector.
6. The particle analyzer of claim 1 comprising in addition:
    means for automatically regulating the response of the particle analyzer to compensate for changes in the sonic propogation characteristics of the fluid suspending the particles.
7. The particle analyzer of claim 6 wherein the automatic regulating means comprise:
    (a) means for transducing sonic energy transmitted through the fluid into an electrical feedback signal; and
    (b) means for controlling the performance of an electrical network contained within the particle analyzer with the feedback signal.
8. The particle analyzer of claim 6 wherein:
    (a) the means for generating sonic energy in the fluid comprise
        a first electroacoustic transducer which generates sonic waves having a direction of propagation orthogonal to the axis of the aperture;
    (b) the means for transducing the sonic energy transmitted through the aperture into electrical signals comprise
        a second electroacoustic transducer having its axis of maximum transducing sensitivity oriented parallel to the axis of the aperture; and
    (c) the means for automatically regulating the re- sponse of the particle analyzer to compensate for changes in the sonic propagation characteristics of the fluid comprise
    a third electroacoustic transducer having its axis of maximum transducing sensitivity oriented parallel to the direction of propagation of the sonic waves generated by the first electroacoustic transducer.

9. The particle analyzer of claim 1 wherein the means for interpreting the electrical signals to determine the characteristics of the particles being drawn through the aperture comprise:
    a phase sensitive detector.

10. The particle analyzer of claim 1 wherein the means for interpreting the electrical signals to determine the characteristics of the particles being drawn through the aperture comprise:
    (a) an amplitude sensitive detector; and
    (b) a phase sensitive detector.

References Cited

UNITED STATES PATENTS

| | | |
|---|---|---|
| 3,093,998 | 6/1963 | Albertson et al. |
| 3,220,261 | 11/1965 | Kriebel _____ 73—432 |

FOREIGN PATENTS

| | | |
|---|---|---|
| 1,463,953 | 11/1966 | France. |

OTHER REFERENCES

Langer, G.: An Acoustic Particle Counter-preliminary Results in Journal of Colloid Science, 20(6), pp. 602–609. August 1965.

LOUIS R. PRINCE, Primary Examiner
JOSEPH W. ROSKOS, Assistant Examiner

U.S. Cl. X.R.
73—67.6; 324—71